J. B. Forsyth
Hose Machine,

Nº 44,254.          Patented Sep. 13, 1864.

Witnesses:

Inventor:
James Bennett Forsyth

UNITED STATES PATENT OFFICE.

JAMES BENNETT FORSYTH, OF ROXBURY, MASSACHUSETTS, ASSIGNOR TO HIMSELF AND CHARLES McBURNEY, OF SAME PLACE.

IMPROVED MACHINE FOR MAKING INDIA-RUBBER HOSE, BELTING, &c.

Specification forming part of Letters Patent No. 44,254, dated September 13, 1864.

*To all whom it may concern:*

Be it known that I, JAMES BENNETT FORSYTH, of Roxbury, in the county of Norfolk and State of Massachusetts, have invented a new and useful machine for making hose, belting, cord, and other similar articles of india-rubber; and I hereby declare the following to be a full, clear, and exact description thereof, reference being had to the accompanying drawings, making a part of this specification, in which—

Figure 2:
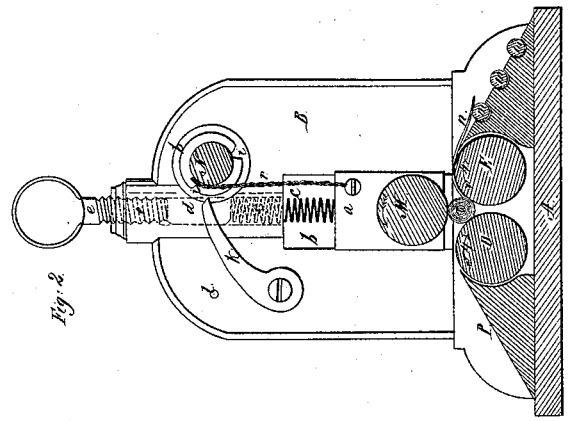
Figure 1:
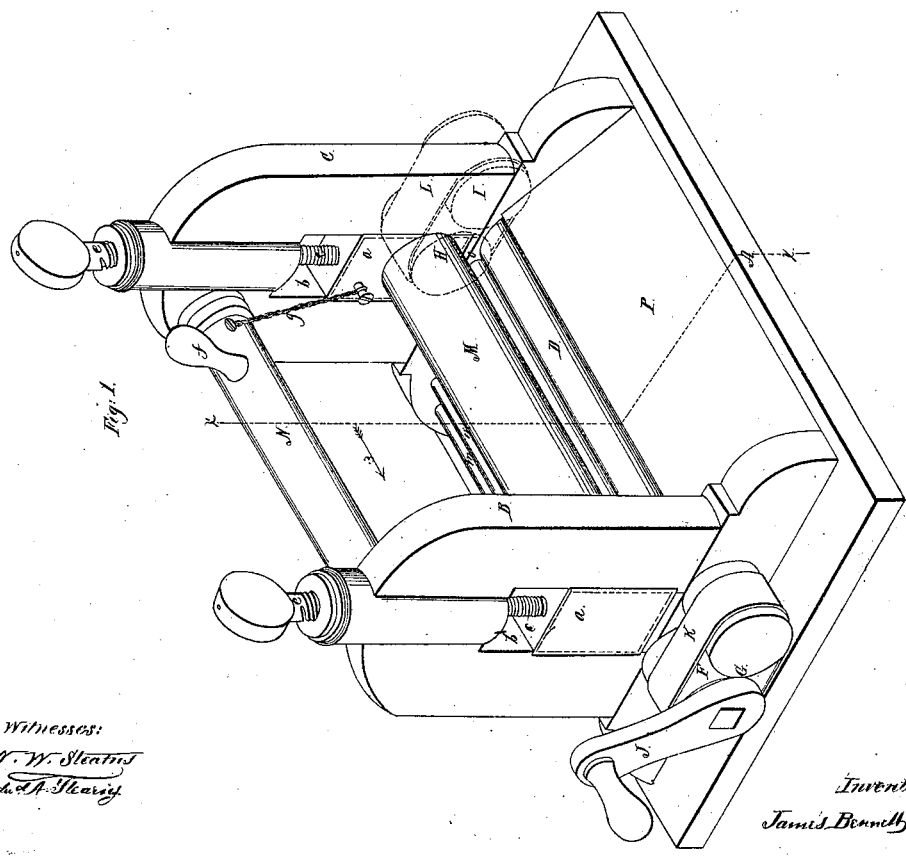

Figure 1 is a view of the machine; and Fig. 2 is a section on the line $x\,x$ of Fig. 1, looking in the direction of the arrow 3.

Articles of rubber manufacture—such as hose, tubing, and pressure-rolls, as well as round belting and cord of solid packing—have heretofore been made entirely by hand. In making hose the material was wrapped around a wooden or metallic mandrel, of the required length and diameter, and placed upon friction-rolls on a table, where it was pressed and laid on evenly by hand-rollers, which were run longitudinally over the folds after each partial revolution of the mandrel. Where an article was composed of solid packing, as round belting, the same operation was gone through with, excepting instead of the mandrel a narrow strip of sheet-rubber was used to start the roll. As only a small portion of the roll—say one-eighth of its circumference—was turned at one operation, the rubber was laid on at successive stages, which method was slow and laborious, and consequently expensive, while the work was frequently imperfectly finished.

The object of my invention is to overcome these difficulties; and it consists in winding the rubber, either solid or around a mandrel, by placing it longitudinally between rolls or cylinders, which are revolved by any suitable power applied to gears or drums at their extremities.

To enable others skilled in the art to understand and use my invention, I will now proceed to describe the manner in which I have carried it out.

In the said drawings, A is the bed of the machine, from which rise the standards B and C. The lower rolls, D and E, have permanent bearings in the standards, and carry at their extremities the drums or pulleys F G H I, (the two latter being shown in red, Fig. 1.) The roll D is revolved by any suitable power applied to the crank J, and communicates motion to the roll E by means of the endless belts K and L, which pass over the pulleys F G H I, thereby causing the rolls D and E to revolve in the direction shown by the arrows 4. (See Fig. 2.) The journals of the upper roll, M, have their bearings in movable boxes $a$, which rise and fall in recesses $b$ within the standards. Pressure is applied to the boxes $a$, so as to force down the roll M in the following manner: Within each standard is a recess for the reception of a spring, $c$, with its lower end resting in the top of the block $a$, while its upper end is covered by a cap-piece, $d$, (seen dotted in Fig. 2,) which is acted on by a thumb-screw, $e$. A spindle, N, provided with a handle, $f$, has its bearings in the upper part of the standards, and is connected by chains $g$ with the boxes $a$, in which the journals of the upper roll run. A collar, $h$, on one end of the spindle N, is provided with notches $i$, into which a pawl, $k$, falls when the roll M is required to be held up. A pin, $l$, acts a stop to prevent the pawl from being thrown over too far.

$m$ are friction-rolls, having their bearings in the frame, and are arranged one above the other, so as to form an incline to facilitate the passage of the rubber cloth or sheet $n$ to the rolls and around the mandrel $o$, placed between them.

$p$ is an incline down which the article rolls as it passes from the machine.

I will now describe the operation of making hose by my improved method. A strip of sheet-rubber is cut of sufficient width to form the size of the orifice desired, and its edges being shaved or trimmed down it is rubbed over with camphene applied by a sponge. A mandrel of the proper diameter is then laid on it and the edges brought up together and firmly fastened by a sticking-iron, thus forming a tube around the mandrel. A piece of rubber cloth of the right length to form the number of plies desired is then taken and rubbed with camphene, and one of its edges laid carefully on the tube, to which it adheres. The other end of the rubber cloth is fastened to another piece of sheet-rubber of the exact length to form the outer casing of the finished hose. The mandrel, with the attached rubber, is now placed between the rolls D and E, and the upper roll, M, is released and forced down on it by the pressure of the spring c. The rolls are set in motion by power applied to the crank J, and the multiplied thicknesses of rubber are rapidly, uniformly, and compactly laid on, and, the upper roll being raised, the hose rolls out down the incline, when the outside edge of the rubber is run over by a sticking-iron, which fastens it down securely, and the hose is finished.

One of these machines will perform in a given time as much work as four to ten men, depending on the description of the article made.

What I claim as my invention, and desire to secure by Letters Patent, is—

A machine for making hose, round packing, cord, wringer-rolls, tubing, and similar articles of rubber or rubber and cloth, consisting, essentially, of the parallel rolls D, E, and M, operating substantially as described.

JAMES BENNETT FORSYTH.

Witnesses:
 N. W. STEARNS,
 EDWD. A. STEARNS.